OR  3,973,825

United States
Starkweather 3,973,825
Aug. 10, 1976

[54] FLAT FIELD SCAN

[75] Inventor: Gary Keith Starkweather, Saratoga, Calif.

[73] Assignee: Xerox Corporation, Stamford, Conn.

[22] Filed: Dec. 30, 1974

[21] Appl. No.: 537,639

[52] U.S. Cl. ........................... 350/6; 355/8; 250/235
[51] Int. Cl.² ............... G02B 27/17; G03G 15/28
[58] Field of Search ............ 350/6, 7, 285; 178/7.6, 178/6.7; 250/236, 235, 234; 355/8, 11, 66, 65, 60, 49, 51; 356/167, 203

[56]  References Cited
UNITED STATES PATENTS

| | | | |
|---|---|---|---|
| 3,360,659 | 12/1967 | Young | 356/167 |
| 3,448,458 | 6/1969 | Carlson et al. | 350/6 |
| 3,497,298 | 2/1970 | Watanabe | 355/66 |
| 3,652,156 | 3/1972 | Lahr et al. | 350/6 |
| 3,661,456 | 5/1972 | Suzuki | 355/66 |
| 3,689,145 | 9/1972 | Kawakubo et al. | 355/8 |

OTHER PUBLICATIONS

Rabedeau, "Mechanical Scanner", IBM Tech. Dis. Bul., vol. 8, No. 2, July, 1965, pp. 276–277.
Davioge, "Document Scanning Mechanism", IBM Tech. Dis. Bul., vol. 15, No. 9, Feb., 1973, pp.2687–2688.

*Primary Examiner*—John K. Corbin
*Assistant Examiner*—Jon W. Henry
*Attorney, Agent, or Firm*—Sheldon F. Raizes

[57]  ABSTRACT

A flat field scanning system is disclosed which has the following characteristics: (a) a stationary lens is located between a mirror and a medium; (b) the mirror is moved linearly for scanning; (c) at the start of scan, a beam is directed from or received by the mirror substantially on axis of the lens; (d) the beam distance from the object plane of the lens to the lens and from the lens to the image plane of the lens always increases from the start of scan to the end of scan; and (e) during movement of the mirror, the mirror is pivoted to continue to reflect the beam through or receive the beam from the center of the lens. Linear movements are utilized in the scanning system eliminating the use of intricate cam surfaces.

In one embodiment, the medium is either a recording medium or a document to be read by scanning and is located at the image plane of the lens. The scanning mirror is located between the object plane of the lens and the lens and scans the beam to the medium. A polygon scanner scans a beam onto the medium via the scanning mirror in an "X" direction while the scanning mirror provides scanning of the beam in a "Y" direction. In a modification of the above embodiment, an oscillating mini-scan mirror is located between the scanning mirror and the object plane and scans the beam to the scanning mirror in the "Y" direction. The scanning mirror is stationary allowing the mini-scan mirror to "Y" scan only a portion of the medium, which is usually 20–32 "X" scan lines or one text line. The scanning mirror is moved one text line at a time to allow mini "Y" scanning of the whole medium.

In another embodiment, the medium is a document illuminated by flood lamps and is positioned on the object plane of the lens. The scanning mirror is located between the image plane of the lens and the lens. A recording medium is located at the image plane of the lens to receive the image on the document.

19 Claims, 5 Drawing Figures

FLAT FIELD SCANNING SYSTEM

DESCRIPTION OF THE INVENTION

In prior art flat field scanning systems, it is customary to maintain the optical path a constant length during scanning to maintain the optical conjugate of the system. This usually requires moving several mirrors (including a scanning mirror) at relative speeds or moving mirrors and a lens. Other flat field scanning systems utilizing a pivoting scanning mirror provide exotic cams for moving the pivot point of the mirror to maintain a constant beam path length. Such constructions require intricate designs, synchronization and are complicated in construction.

It is an object of this invention to provide a flat field scanning system which is simple to design, construct and operate.

It is proposed to achieve the above object by providing a stationary imaging lens between a scanning mirror and a medium that is scanned and increasing the optical path length between the object plane of the lens and the lens and between the lens and the medium while at the same time maintaining the optical conjugate of the lens substantially constant to maintain the medium within the depth of focus of the lens throughout the scanning operation.

It is a further object of this invention to provide a scanning system for imaging on a planar medium in an operator input mode, which image will be placed on the medium at a speed which will appear instant to the operator.

It is proposed to achieve this last described object by providing a first scanning mirror which is capable of scanning a whole document when operated through a full stroke and providing a second scanning mirror which is positioned to scan a beam onto the medium via the first mirror but is only capable of scanning a mirror portion of the medium when operated through a full stroke. The first mirror is operated through its full stroke in increments, with each movement thereof to a new position allowing the second mirror to scan a new portion of the medium. During the input mode, the first mirror is stationary while the second mirror scans an image onto a limited portion of the medium. When it is desired to scan onto a new section of the medium, the first mirror is moved a given increment and is then stationary as the second mirror scans an image onto the new section of the medium.

Other objects of the invention will become apparent from the following description with reference to the drawings wherein.

Figure 1:
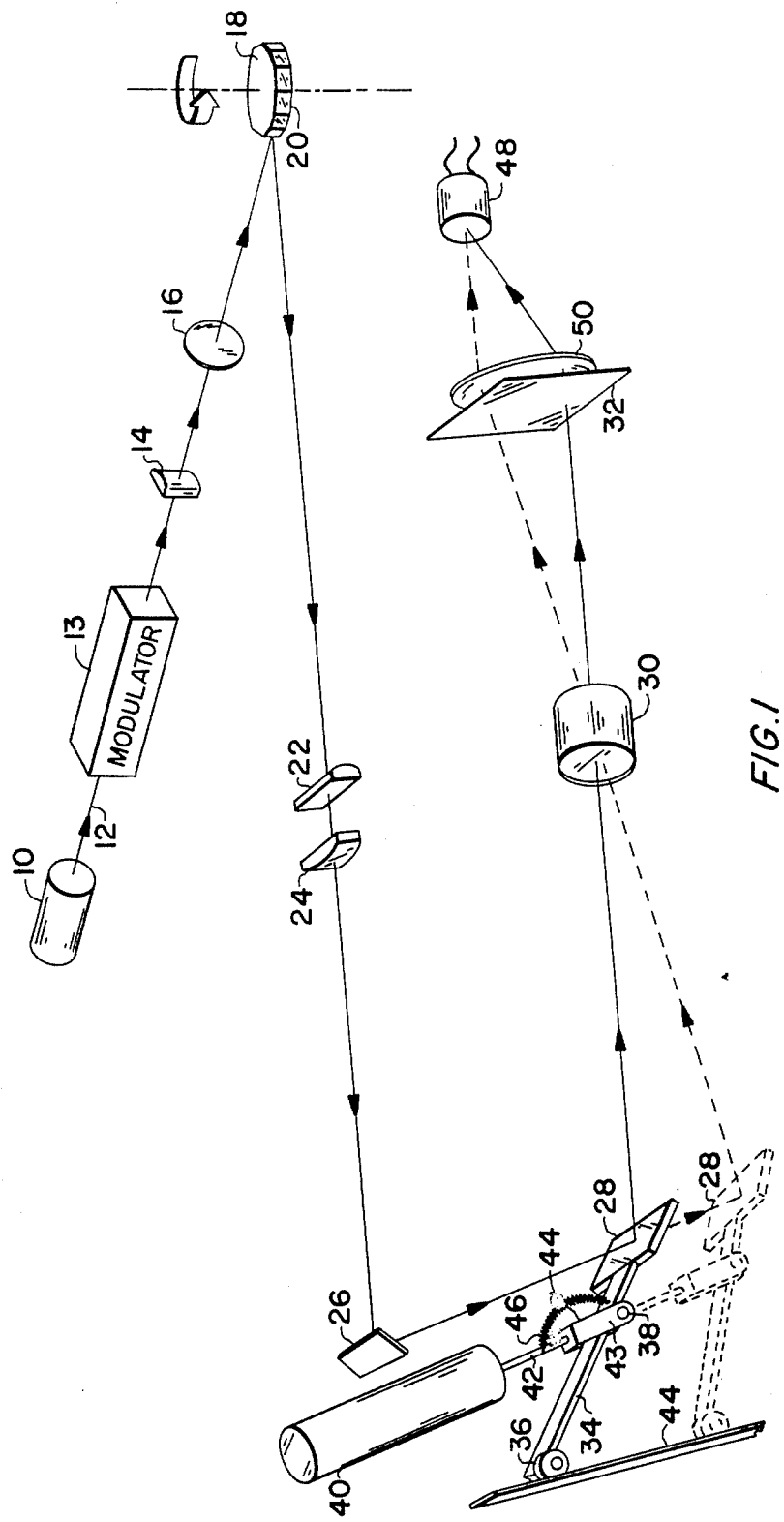
FIG. 1 is an overall view of a scanning system employing the principles of this invention.

Referring to FIG. 1, a laser 10 generates a collimated beam 12 which passes through an acousto-optic modulator 13, a cylinder lens 14 and a spherical imaging lens 16 to a rotating polygon scanner 18 which has a plurality of reflecting facets 20 thereon. The beam is reflected from the facets through another cylinder lens 22, which is utilized for correcting for polygon wobble, a field lens 24, to a mirror 26 which directs the beam to a scanning mirror 28 where the beam reflects therefrom to pass through a microlens 30 onto a stationary medium 32 which may be either a recording medium or a document with an image thereon. A suitable recording medium could be a film for microimaging thereon. A suitable document could be a microfilm with an image thereon. The medium 32 lies in a plane generally perpendicular to the axis of the lens 30.

The mirror 28 has an arm 34 secured thereto which has a roller 36 attached thereto at the free end. A pair of cylindrical trunions 38 are fixed to the arm 34 and extend laterally away from each side thereof. A linear motor 40 has a push rod 42 which is forked at the free end thereof to provide a pair of spaced legs 43 which straddle the arm 34. Each leg 43 has an opening therein receiving a respective trunion 38 to provide a pivotal connection between the mirror 28 and the push rod 42. The linear motor is a commonly used commercial motor which operates in accordance with the amount of voltage applied, with the stroke of the push rod 42 being in a direction away from the motor and proportional to the voltage applied. The push rod 42 is spring loaded to urge the push rod 42 in a return direction toward the motor.

The roller 36 is biased into contact with a ramp 44 by a spring 46 which is attached at one end to the arm 34 and at the other end to the push rod 42 which acts in tension to urge the mirror 28 to pivot in a counterclockwise direction about the trunions 38. The ramp 44 has a planar or linear cam surface. The angle of the mirror must be changed to change the deflection angle to continuously direct the beam 12 through the lens 30. To accomplish this, the trunions 38 are moved linearly by the rod 42 at a diverging angle with the ramp 44 resulting in the mirror 28 rotating about the trunions and thereby changing the angle of the plane of the mirror 28 while the mirror moves linearly along its scanning stroke.

The cylinder lens 14 has its power plane in the tangential plane which is substantially perpendicular to the axis of rotation of the polygon 18 while the cylinder lens 22 has its power plane in the saggital plane which is parallel to the axis of polygon rotation. The cylinder lens 14 spreads the beam 12 in the tangential plane and the imaging lens 16 converges the beam in the tangential plane such that the beam will strike the polygon over a width (in the scanning direction) which is equal to about two facets. The cylinder lens 14 and the imaging lens 16 act in conjunction to focus the beam 12, in the tangential plane, onto an imaging plane 47 and the imaging lens 16 and the cylindrical lens 22 act in conjunction to focus the beam 12, in the sagittal plane, onto the imaging plane 47. The microlens 30 is located that its object plane coincides with plane 47 and its imaging plane coincides with the plane of the medium 32. The beam 12 is imaged onto the medium 32 at about one-tenth its normal size.

The polygon scanner 18 scans the beam 12 across the medium 32 in an "X" direction which is generally perpendicular to the axis of rotation of the polygon and the scanning mirror 28 scans the beam 12 across the medium 32 in a "Y" direction which is generally perpendicular to the "X" direction. In the instance where the medium 32 is a recording medium, alphanumeric imaging thereon by the laser 10 is accomplished by modulating the beam 12 at the appropriate instant as the beam is scanned across the medium 32. There are approximately 20–32 scan lines per text line. In the instance where the medium 32 is a film with an image thereon to be read by beam scanning, the modulator 13 will be so controlled that an unmodulated beam will be directed to the film and a photomultiplier 48 is provided behind the medium 32 to detect the variation of intensity of the beam 12 as the beam sweeps across the medium 32. The photomultiplier 48 converts the beam intensity changes into electrical signals which represent the image information on the film. A lens 50 is provided to image the beam to the photomultiplier 48. It is quite obvious that any type of recording medium or document with an image thereon could be employed as the medium 32 and that suitable lenses can be provided to effect desired sizes of images.

Figure 2:
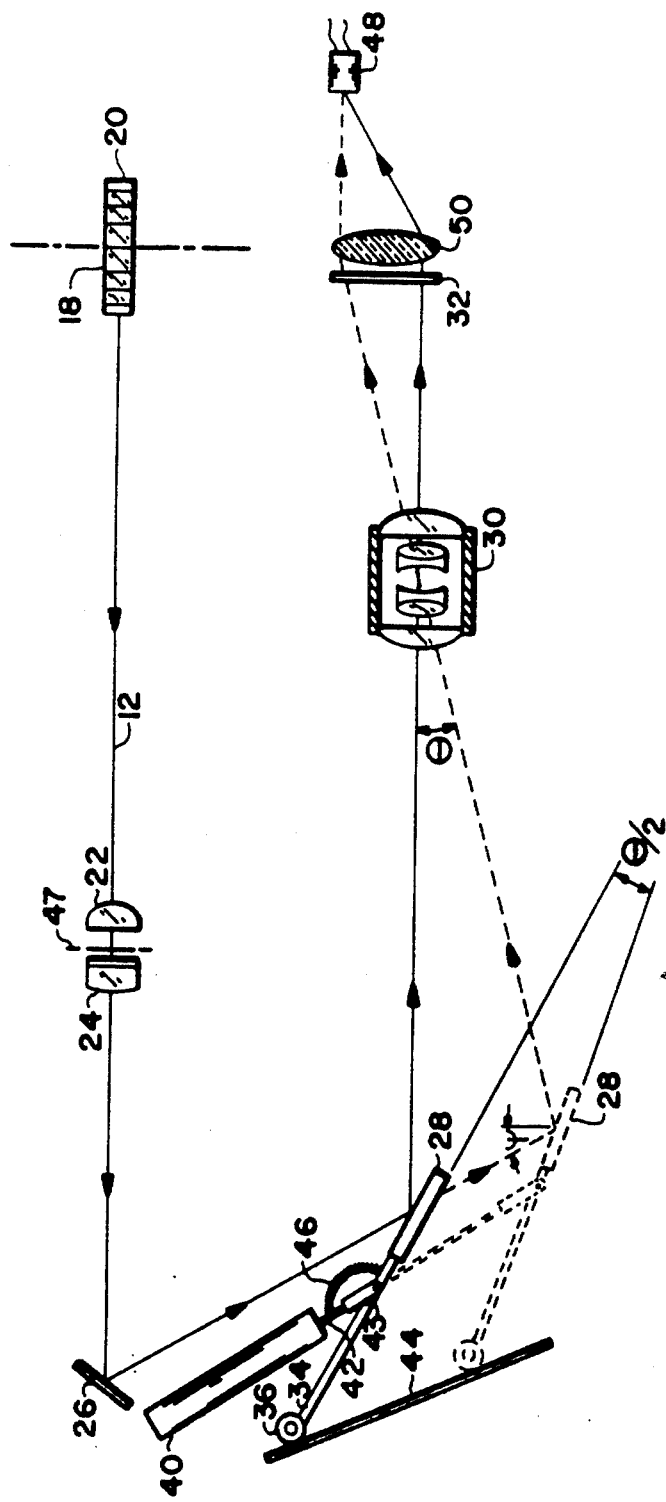
FIG. 2 is a partial side view of FIG. 1.
Figure 3:
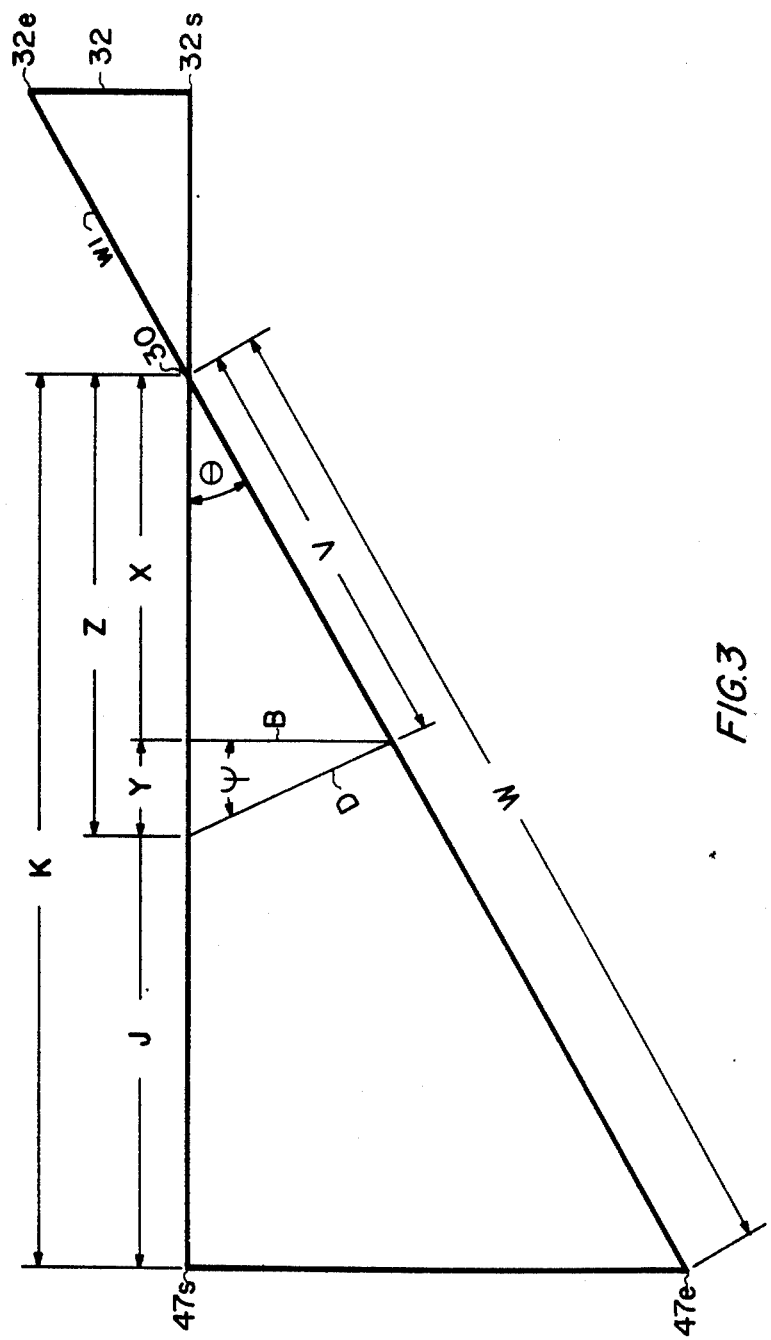
FIG. 3 is a beam schematic for calculation purposes.

Referring to the flat field scanning system in more detail, in FIGS. 1 and 2 the mirror 28 is depicted by a solid line at its start of scan position and is depicted in phantom at its end of scan position. When the mirror is in its start of scan position, the beam 12 is reflected from mirror 28 along a path which is on axis of the lens 30 and substantially perpendicular to the plane of the medium 32. At the end of the scan, the beam 12 is reflected from mirror 28 along a path which is substantially off axis of the lens 30 and at an angle with the plane of the medium 32 thus increasing the distance of the beam path between the lens 30 and the plane of the medium 32 from the start of scan to the end of scan. In order to maintain the beam in focus on the medium 32, the optical distance between the lens 30 and its object plane 47 must be increased proportionally as the increase in optical distance between the lens and the medium 32. This may be represented pictorially by unfolding the beam at the start of scan and end of scan and forming similar triangles $47_s, 30, 47_e$ and $32_s, 30, 32_e$ as depicted in FIG. 3.

In order to determine the stroke for the mirror and the angle relative to the recording medium at which the locus of the intersection of the beam and mirror should move, the following must be calculated:

Let J = the distance from the object plane 47 of lens 30 to the mirror 28 at the start of scan;
Let Z = the on-axis beam distance from the mirror 28 at the start of scan to the lens 30;
Let V = the off-axis beam distance from the mirror 28 at the end of scan to the lens 30;
Let B = the component parallel to the medium 32 corresponding to the beam distance V;
Let X = the component perpendicular to the medium 32 corresponding to the beam distance V;
Let W = the total off-axis beam distance from the object plane 47 to the lens 30 at the end of scan;
Let D = stroke distance of the locus of the intersection of the beam and mirror 28 from start of scan to the end of scan;
Let Y = the component of the stroke distance perpendicular to the medium 32;
Let $\theta$ = the field angle of the lens 30;
Let $\psi$ = the angle, relative to the medium 32, of the locus of the beam, scanning mirror intersection from start of scan to end of scan and, the angle, relative to the medium 32, of the plane of approach of the beam to the scanning mirror; and Let K = J + Z.

(a) $X + Y = Z$ (b) $X = \dfrac{B}{\tan\theta}$.

(c) $Y = B \tan\psi$.
(d) $B = D \cos\psi$.

Substituting for B in equation (b), (e) $X = \dfrac{D \cos\psi}{\tan\theta}$.

Solving for X in equation (a), $Z - Y = X$ and substituting for Y, (f) $Z - B \tan\psi = X$.

Substituting for B in equation (f), (g) $Z - D \cos\psi \tan\psi = X$.

Using equation (e) and substituting for X as defined in equation (g) and solving for D, (h) $D = \dfrac{Z}{\dfrac{\cos\psi}{\tan\theta} + \sin\psi}$.

(i) $J + D + V = W$.

(j) $V = \dfrac{X}{\cos\theta}$.

(k) $W = \dfrac{K}{\cos\theta}$.

Substituting V and W in equation (i), (l) $J + D + \dfrac{X}{\cos\theta} = \dfrac{K}{\cos\theta}$ for ideal conjugate.

Utilizing equation (e) and substituting for D as defined in equation (h), (m) $X = \dfrac{Z \cos\psi}{\cos\psi + \sin\psi \tan\theta}$.

Substituting in equation (l) for D as defined in equation (h) and for X as defined in equation (m), (n) $J + \dfrac{Z}{\dfrac{\cos\psi}{\tan\theta} + \sin\psi} + \dfrac{Z \cos\psi}{\cos\theta(\cos\psi + \sin\psi \tan\theta)} = \dfrac{K}{\cos\theta}$.

In designing the system, the designer selects the distances J, Z and the axial distance between the medium 32 and the lens 30. The designer also knows the height of the medium 32. Since the designer knows the distances 30, $32_s$ and $32_s$, $32_e$, he can solve for the maximum field angle $\theta$. This leaves the angle $\psi$ as the only unknown to be solved for in equation (n). Recognizing that this equation is ideal only for one set of values of J, Z, K and angle $\psi$ at a given angle $\theta$ and that the same set of values must remain constant during scanning where angle $\theta$ changes, one must calculate the difference between the ideal conjugate at a given angle $\theta$ and the actual conjugate at the same angle $\theta$. For instance, at any angle $\theta$, the conjugate is calculated by the equation $$(o) \quad \frac{1}{W} + \frac{1}{w} = \frac{1}{f},$$

where
f = focal length of the lens 30.
Solving for w in equation (o), $$(p) \quad w = \frac{Wf}{W-f}.$$

Let $W_i$ and $w_i$ be the ideal conjugate distances.
Let $W_a$ and $w_a$ be the actual conjugate distances.
Substituting $w_i$ and $W_i$ for w and W, respectively, in equation (p), $$(q) \quad w_i = \frac{W_i f}{W_i - f},$$

where $$W_i = \frac{K}{\cos\theta} = \frac{J+Z}{\cos\theta}.$$

Substituting $w_a$ and $W_a$ for w and W, respectively, in equation (p), $$(r) \quad w_a = \frac{W_a f}{W_a - f},$$

where $$W_a = J + \frac{Z}{\frac{\cos\psi}{\tan\theta} + \sin\psi} + \frac{Z\cos\psi}{\cos\theta(\cos\psi + \sin\psi\tan\theta)}$$

[see equation (n)]

The tolerable depth of focus (DOF) at the image plane for the lens is defined as:

(s) DOF = (4) ($\Lambda$) (f/No.)$^2$, where
$\Lambda$ = the wave length of illumination and
f/ = the f number of the lens 30.

The difference $w_i - w_a$ is then calculated for a number of angles $\theta$ from start of scan to end of scan. The absolute sum of the maximum variation of best focus on each side of the image plane determined by $w_i - w_a$ for these angles must be equal to or less than the depth of focus in order for the beam to remain in focus on the medium 32 throughout the scan. In other words, (t) $(w_i - w_a)_1 + (w_i - w_a)_2 \leq$ DOF, where
$(w_i - w_a)_1$ = absolute maximum variance on one side of the image plane, and
$(w_i - w_a)_2$ = absolute maximum variance on the opposite side of the image plane.

If equation (t) does not hold on the first selection of the constants, J, Z, K and the maximum angle $\theta$, then some of these values will have to be changed until equation (t) is satisfied.

In order that the mirror 28 reflect the beam 12 through the center of the lens 30 at the end of the scan, the plane of the mirror must pivot in a counterclockwise direction $\theta°/2$. In order to compensate for this, the angle between the ramp and the medium 32 is reduced from angle $\psi$ an appropriate amount depending upon the length of pivot arm 34 and the magnitude of angle $\theta$.

Figure 4:
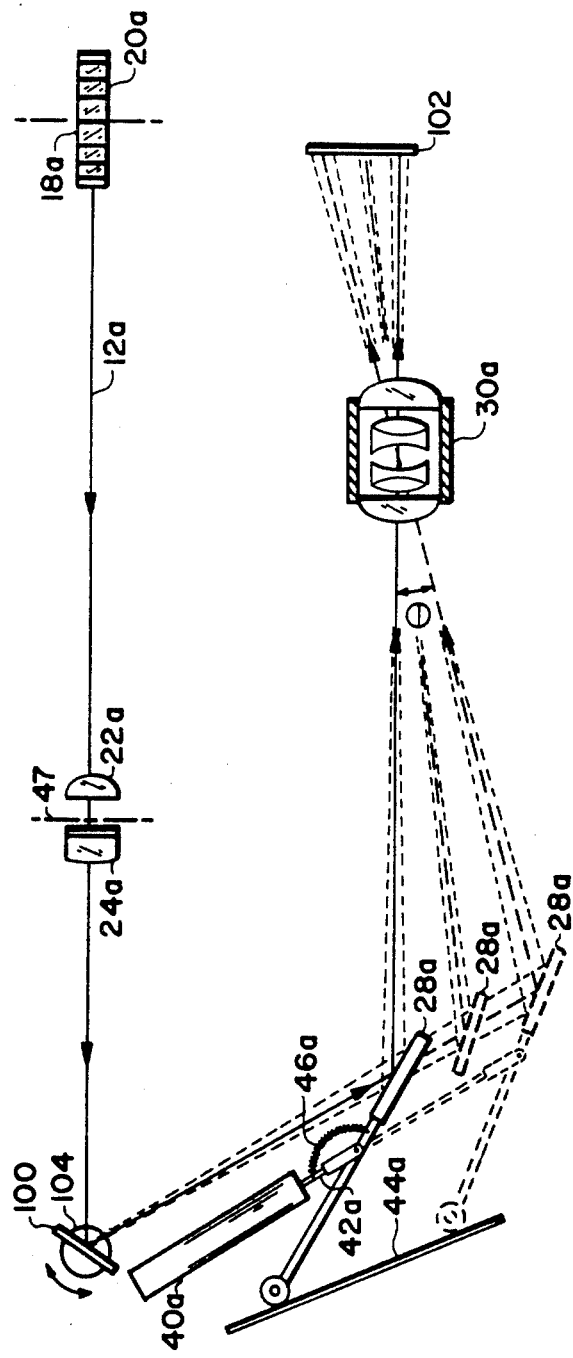
FIG. 4 is a modification of the embodiment of FIGS. 1–3 employing the flat scan principles thereof.

Referring to FIG. 4, there is shown a modification of the embodiment of FIGS. 1–3. The elements of the previous embodiment, which are the same, are designated by the same reference numerals only with an *a* affixed thereto. The previous embodiment is modified by substituting an oscillating mini-scan mirror 100 in place of fixed mirror 26 and a planar Ruticon 102 for the medium 32.

The Ruticon 102 is a solid-state cyclic image recording device which is a layered structure consisting of a conductive transparent substrate, a thin photoconductive layer, a thin deformable elastomer layer, and a deformable electrode such as a conductive liquid, a conductive gas or a thin flexible metal layer. When an electric field is placed between the conductive substrate and the deformable electrode, the elastomer will deform into a surface relief pattern corresponding to a light-intensity distribution of an image focused on the photoconductor. Light modulated by the deformation of the elastomer surface can in turn be converted to an intensity distribution similar to the original image by means of simple optics. More information on the Ruticon may be found in IEEE TRANSACTIONS ON ELECTRON DEVICES, Vol. ED-19, No. 9, September, 1972, pages 1003–1010, which is hereby incorporated herein by reference.

In this embodiment, an image is being printed on the Ruticon by modulating the beam 12a at the proper instant. The image on the Ruticon 102 may be read out with a phase-sensitive optical readout system such as a Schlierren system and is directed to a real time visual display. The provision of the oscillating mini-scan mirror 100 is for use in a system where an operator is typing into a memory system utilizing a visual display. Studies have shown that a one-half second or longer delay between character input and display thereof on a screen is annoying to the operator as the operator wants to see the input character on the visual display as soon as he types it into the system. If the previous described system were utilized, there could be a delay as long as a complete stroke of the scanning mirror 28 before the character would be imaged on the Ruticon if the operator input took place immediately after the mirror 28 had just scanned the location on the Ruticon therefor.

To avoid the above type of delay, the mirror 100 is oscillated by a galvanometer 104 to provide a beam scan in the "Y" direction over a span of one text line which may comprise approximately 20–32 scan lines. As in the previous embodiment, the polygon scanner 18a provides a beam scan in the "X" direction. The mirror 28a is kept stationary until a text line is imaged and then is moved down the ramp 44a by the motor 40a the distance of another text line where it becomes stationary again while the mini-scan mirror 100 provides the "Y" scan for the new text line. The linear motor 40a may be actuated each time the operator presses a carriage return or any other member which indicates the end of an input on a text line. Properly designed circuits will supply sufficient voltage to the motor 40a to move the rod 42a and thereby the mirror 28a down the ramp 44a a distance of one text line upon each successive actuation. Also, if desired, an optical encoder can be utilized to detect the position of the rod 42a and thereby the position of the mirror 28a and, with properly designed circuitry, the motor 40a can be operated to move the mirror to any location desired for insertions in previously imaged text lines or for other purposes. From this construction, one can see that the most an operator must wait from character input to imaging of the character onto the Ruticon is one complete oscillation of the mirror mini-scanner 100 which will be approximately about 50 times faster than a complete stroke of mirror 28, assuming approximately 50 text lines per document.

Figure 5:
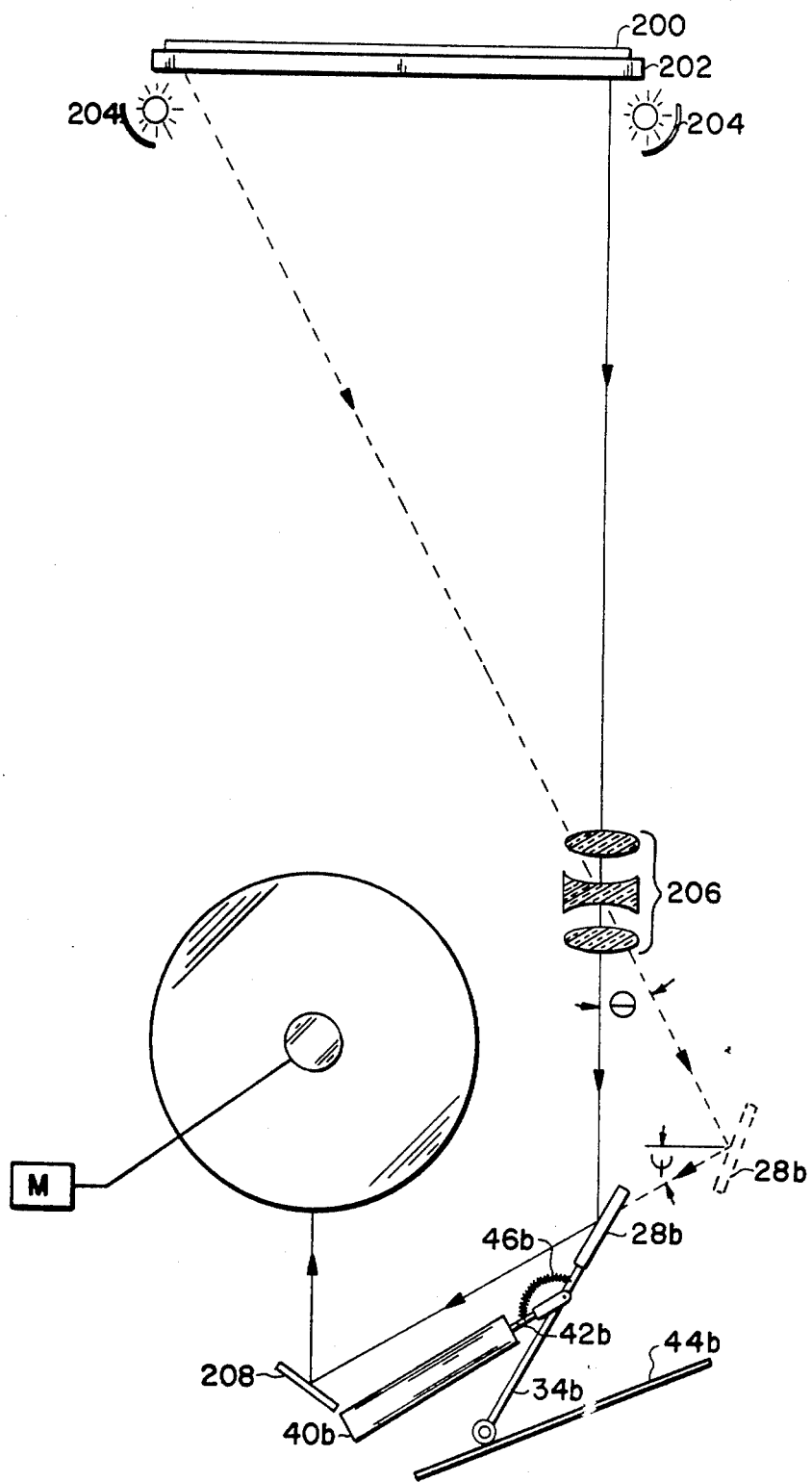
FIG. 5 is a schematic side view of a scanning system for a copier employing the flat scan principles of the previous embodiments.

The same linear scan mirror may also be utilized in imaging a document directly onto a photosensitive recording medium as depicted in FIG. 5. The scanning mirror and its associated elements which operate in the same manner as described in the previous embodiments are designated by the same reference numerals, only with a *b* affixed thereto. A stationary flat document 200, resting on platen 202, is illuminated by flood lamps 204. A stationary imaging lens 206 is interposed between the document platen 202 and the scanning mirror 28*b* and is designed to image the document via the scanning mirror 28*b* and a stationary mirror 208 to a recording medium in the form of a drum 210 coated with a photosensitive material such as selenium. A motor M is operatively connected to drum 210 to rotate the same and well-known xerographic methods are utilized to charge the drum, develop an image thereon and transfer the same to a copy medium. As the mirror 28*b* is moved down the ramp 44*b*, successive increments on the illuminated document 200 in the "Y" direction are scanned to the drum to form a latent image thereon. In this particular embodiment, an imaging lens is shown between the platen and the scanning mirror 28*b*. Obviously, other lenses may be employed as long as the image plane for the stationary lens or lenses between the platen and the scanning mirror is located between the scanning mirror and the recording medium.

From the above, it can be seen that a simple scanning system is provided with the following characteristics for the embodiment disclosed: (a) the mirror 28, 28*a*, 28*b*, during scanning, is moved linearly so that the locus of the beam, mirror intersection is at an angle ψ with the plane of the medium 32, 102, 200; (b) at the start of scan, the beam is directed from or received by the scanning mirror 28 substantially on axis of the stationary lens 30; (c) the beam distance from the object plane of the lens to the lens and from the lens to the image plane of the lens always increases from the start of scan to the end of scan; (d) during linear movement of the mirror 28, 28*a*, 28*b*, the mirror is pivoted through an angle θ/2 to reflect the beam through or receive the beam from the center of the lens 30; and (e) no intricate cam surface is needed to accomplish the above as linear or planar surface 44 is utilized and the push rod 42 is moved along a linear path.

What is claimed is:

1. In a flat field scanning system: a source of illumination; a beam generated by said source; a scanning mirror; a stationary, generally planar member to be scanned; stationary imaging lens means optically located between said planar member and said scanning mirror; said scanning mirror being located between the object plane of said lens means and said lens means; scanning means located between said illumination source and said scanning mirror for scanning said beam across said mirror in an "X" direction; means mounting said scanning mirror for linear movement along a path transverse to said "X" direction and at an angle to said planar member from a start of scan position to an end of scan position to provide a scan of said beam in a "Y" direction generally perpendicular to said "X" direction; said scanning mirror at the start of scan position reflecting said scanned beam substantially on axis through said lens means to said planar member and at the end of scan position reflecting the same off axis through said lens means to said planar member to provide an "X" and "Y" scan of said beam onto said planar member; means for directing said beam to said scanning mirror along substantially the same optical path throughout the linear movement of said scanning mirror; means for pivoting said scanning mirror during said linear movement in such a manner that said beam is continuously directed through said lens means when said scanning mirror is moved from said start of scan position to said end of scan position; the optical path length between said lens means and said planar member continuously increasing from start of scan to end of scan and the optical path length between said object plane and said lens means continuously increasing from start of scan to end of scan, by linear scanning movement of said scanning mirror, in substantially the same proportion that the optical path length between said lens means and said planar member increases; said planar member being located within the depth of focus of said lens means from start of scan to end of scan.

2. The flat field scanning system of claim 1 wherein a modulator is in the path of said beam between said illumination source and said scanning means for modulating said beam; said planar member being a recording medium.

3. The flat field scanning system of claim 1 wherein said planar member is a medium with an image thereon; and means for detecting variations in intensity of said beam as said beam scans across the image.

4. The flat field scanning system of claim 1 wherein said means for mounting said scanning mirror for linear movement includes a linearly movable member; said scanning mirror is pivotally mounted to said movable member; a planar cam surface oblique to the direction of linear movement of said linearly movable member; a cam follower operatively connected to said scanning mirror; said means for pivoting said scanning mirror including means for urging said cam follower into engagement with said cam surface to rotate said scanning mirror about said pivotal connection during scanning.

5. The flat field scanning system of claim 1 wherein the following relationship is observed:

$$J + \frac{Z}{\frac{\cos\psi}{\tan\theta} + \sin\psi} + \frac{Z\cos\psi}{\cos\theta(\cos\theta + \sin\psi\tan\theta)} = \frac{K}{\cos\theta}$$

where:
- $J$ = the distance from the object plane of said lens means to said scanning mirror at start of scan;
- $Z$ = the on-axis beam distance between said scanning member and said lens means at start of scan;
- $K = J + Z$
- $\theta$ = the maximum field angle of said lens means between start of scan and end of scan; and
- $\psi$ = a fixed angle relative to said planar member of the locus of the beam, scanning mirror intersection from start of scan to end of scan and the angle, relative to said planar member, of the plane of approach of said beam to said scanning mirror.

6. The flat field scanning system of claim 5 wherein said means for mounting said scanning mirror for linear movement includes a linearly movable member; said scanning mirror is pivotally mounted to said movable member; a planar cam surface oblique to the direction of linear movement of said linearly movable member; a cam follower operatively connected to said scanning mirror; said means for pivoting said scanning mirror including means for urging said cam follower into engagement with said cam surface to rotate said scanning mirror through an angle of θ/2 about said pivotal connection during scanning.

7. The flat field scanning system of claim 1 further comprising a mini-scan oscillating mirror optically located between said scanning means and said scanning mirror; said scanning means scanning said beam in the "X" direction across said mini-scan mirror; said mini-scan mirror oscillating about an axis generally parallel to the "X" direction of scan of said beam thereacross; said mini-scan mirror directing said beam to said scanning mirror and scanning said beam across said scanning mirror in a "Y" direction which is transverse to said "X" direction; the amount of "Y" scan by said mini-scan mirror providing a "Y" scan of said beam onto only a minor portion of said planar member; and means for moving said scanning mirror in increments from said start of scan position to said end of scan position to allow said mini-scan mirror to scan the entire planar member.

8. The flat field scanning system of claim 4 further comprising a mini-scan oscillating mirror optically located between said scanning means and said scanning mirror; said scanning means scanning said beam in the "X" direction across said mini-scan mirror; said mini-scan mirror oscillating about an axis generally parallel to the "X" direction of scan of said beam thereacross; said mini-scan mirror directing said beam to said scanning mirror and scanning said beam across said scanning mirror in a "Y" direction which is transverse to said "X" direction; the amount of "Y" scan by said mini-scan mirror providing a "Y" scan of said beam onto only a minor portion of said planar member; and means for moving said scanning mirror in increments from said start of scan position to said end of scan position to allow said mini-scan mirror to scan the entire planar member.

9. The flat field scanning system of claim 5 further comprising a mini-scan oscillating mirror optically located between said scanning means and said scanning mirror; said scanning means scanning said beam in the "X" direction across said mini-scan mirror; said mini-scan mirror oscillating about an axis generally parallel to the "X" direction of scan of said beam thereacross; said mini-scan mirror directing said beam to said scanning mirror and scanning said beam across said scanning mirror in a "Y" direction which is transverse to said "X" direction; the amount of "Y" scan by said mini-scan mirror providing a "Y" scan of said beam onto only a minor portion of said planar member; and means for moving said scanning mirror in increments from said start of scan position to said end of scan position to allow said mini-scan mirror to scan the entire planar member.

10. The flat field scanning system of claim 6 further comprising a mini-scan oscillating mirror optically located between said scanning means and said scanning mirror; said scanning means scanning said beam in the "X" direction across said mini-scan mirror; said mini-scan mirror oscillating about an axis generally parallel to the "X" direction of scan of said beam thereacross; said mini-scan mirror directing said beam to said scanning mirror and scanning said beam across said scanning mirror in a "Y" direction which is transverse to said "X" direction; the amount of "Y" scan by said mini-scan mirror providing a "Y" scan of said beam onto only a minor portion of said planar member; and means for moving said scanning mirror in increments from said start of scan position to said end of scan position to allow said mini-scan mirror to scan the entire planar member.

11. The flat field scanning system of claim 7 wherein a modulator is in the path of said beam between said illumination source and said scanning means for modulating said beam; said planar member being a recording medium.

12. The flat field scanning system of claim 8 wherein a modulator is in the path of said beam between said illumination source and said scanning means for modulating said beam; said planar member being a recording medium.

13. The flat field scanning system of claim 9 wherein a modulator is in the path of said beam between said illumination source and scan scanning means for modulating said beam; said planar member being a recording medium.

14. The flat field scanning system of claim 10 wherein a modulator is in the path of said beam between said illumination source and said scanning means for modulating said beam; said planar member being a recording medium.

15. In a copier having a document station with a generally planar platen having a document receiving surface thereon, means for illuminating said document station, a recording medium and means for imaging a document to said recording medium, said imaging means comprising: a scanning mirror optically located between said recording medium and said document station and arranged to scan a beam from said document station to said recording medium; stationary imaging lens means optically located between said document station and said mirror; said mirror being optically located between said lens means and an image plane of said lens means; means mounting said scanning mirror for linear movement along a path at an angle to said platen from a start of scan position to an end of scan position; said scanning mirror at the start of scan position receiving a substantially on-axis beam from said platen surface through said lens means and at the end of scan position receiving an off-axis beam from said platen surface through said lens means; means for pivoting said scanning mirror during said linear movement in such a manner that the beam from said document station is continuously scanned to said recording medium by said scanning mirror along substantially the same optical path from start of scan position to end of scan position; the optical path length between said lens means and said platen surface continuously increasing from start of scan to end of scan and the optical path length between said image plane and said lens means continuously increasing from start of scan to end of scan, by linear scanning movement of said scanning mirror, in the same proportion that the optical path length between said lens means and said platen surface increases; said platen surface being located within the depth of focus of said lens means from start of scan to end of scan.

16. The structure as recited in claim 15 wherein said recording medium is at said image plane.

17. The structure as recited in claim 15 wherein said means for mounting said scanning mirror for linear movement includes a linearly movable member; said scanning mirror is pivotally mounted to said movable member; a planar cam surface oblique to the direction of linear movement of said linearly movable member; a cam follower operatively connected to said scanning mirror; said means for pivoting said scanning mirror including means for urging said cam follower into engagement with said cam surface to rotate said scanning mirror about said pivotal connection during scanning.

18. The structure as recited in claim 15 wherein the following relationship is observed:

$$J + \frac{Z}{\frac{\cos\psi}{\tan\theta} + \sin\psi} + \frac{Z\cos\psi}{\cos\theta(\cos\theta + \sin\psi\tan\theta)} = \frac{K}{\cos\theta}$$

where:

$J$ = the distance from the image plane of said lens means to said scanning mirror at start of scan;

$Z$ = the on-axis beam distance between said scanning mirror and said lens means at start of scan;

$K = J + Z$ $\theta$ = the maximum field angle of said lens means between start of scan and end of scan; and $\psi$ = a fixed angle relative to said platen surface of the locus of the beam, scanning mirror intersection from start of scan to end of scan and the angle, relative to said platen, of the path that said beam is scanned by said scanning mirror toward said recording medium.

19. The structure as recited in claim 18 wherein said means for mounting said scanning mirror for linear movement includes a linearly movable member; said scanning mirror is pivotally mounted to said movable member; a planar cam surface oblique to the direction of linear movement of said linearly movable member; a cam follower operatively connected to said scanning mirror; said means for pivoting said scanning mirror including means for urging said cam follower into engagement with said cam surface to rotate said scanning mirror through an angle of $\theta/2$ about said pivotal connection during scanning.

* * * * *

UNITED STATES PATENT AND TRADEMARK OFFICE
CERTIFICATE OF CORRECTION

PATENT NO. : 3,973,825
DATED : August 10, 1976
INVENTOR(S) : Gary Keith Starkweather It is certified that error appears in the above-identified patent and that said Letters Patent are hereby corrected as shown below:

Column 5, on the left side of the equations (q) and (r), change the large "W" to a small "w" so the equations will read as follows:

$$(q) \quad w_i = \frac{W_i f}{W_i - f},$$

$$(r) \quad w_a = \frac{W_a f}{W_a - f},$$

Column 5, line 43, after "f/" insert --No.--.

Column 5, please make all the "W" appearing in lines 44, 47, 51, 53 and 55 the same small "w" as the corrected small "w" on the left side of equations (q) and (r).

Column 10, line 22, "scan" should read --said--.

Signed and Sealed this

Eighth Day of February 1977

[SEAL]

Attest:

RUTH C. MASON
*Attesting Officer*

C. MARSHALL DANN
*Commissioner of Patents and Trademarks*